United States Patent [19]
Strolle et al.

[11] Patent Number: 5,526,131
[45] Date of Patent: Jun. 11, 1996

[54] DATA CODING FOR A DIGITAL VIDEO TAPE RECORDER SUITABLE FOR HIGH SPEED PICTURE PLAYBACK

[75] Inventors: Christopher H. Strolle, Glenside, Pa.; Steven T. Jaffe, Freehold; Tianmin Liu, Lawrenceville, both of N.J.

[73] Assignee: Samsung Electronics Co., Ltd, Kyungki-Do, Rep. of Korea

[21] Appl. No.: 214,153

[22] Filed: Mar. 17, 1994

Related U.S. Application Data

[63] Continuation of Ser. No. 983,748, Dec. 1, 1992, abandoned.
[51] Int. Cl.$^6$ .............................. H04N 5/76; H04N 5/78; H04N 7/12
[52] U.S. Cl. ................. 358/335; 360/10.1; 368/386
[58] Field of Search ...................... 358/310, 342, 358/335, 312, 315, 330; 360/10.1, 10.3, 11.1, 24, 32; 348/384, 397, 398, 400, 401, 402, 410, 414

[56] References Cited

U.S. PATENT DOCUMENTS

| | | | |
|---|---|---|---|
| 4,807,053 | 2/1989 | Heijnemans . | |
| 5,068,744 | 11/1991 | Ito | 358/310 |
| 5,136,391 | 8/1992 | Minami | 358/310 |
| 5,136,394 | 8/1992 | Haikawa et al. . | |
| 5,140,437 | 8/1994 | Yonemitsu et al. | 358/342 |
| 5,196,933 | 3/1993 | Henot | 358/136 |
| 5,282,049 | 1/1994 | Hatakanaka et al. | 358/335 |
| 5,335,117 | 8/1996 | Park et al. | 360/48 |

*Primary Examiner*—Thai Q. Tran
*Assistant Examiner*—Robert Chevalier
*Attorney, Agent, or Firm*—Sughrue, Mion, Zinn, Macpeak & Seas

[57] ABSTRACT

A method and apparatus for compression encoding successive input images into a plurality of sync blocks which are sequentially recorded on a record carrier, comprises digitally processing each of the input images in accordance with a first image compression encoding technique so as to provide a first digital signal representative of a low resolution version of each of the input images. The input images are also digitally processed in accordance with a second image compression encoding technique which is different from the first image compression encoding technique so as to provide a second digital signal representative of a higher resolution version of each of the input images. Consecutive portions of both of the first and second digital signals are combined into sequential sync blocks which are then sequentially recorded on a record carrier.

27 Claims, 2 Drawing Sheets

DATA CODING FOR A DIGITAL VIDEO TAPE RECORDER SUITABLE FOR HIGH SPEED PICTURE PLAYBACK

This is a continuation of application Ser. No. 07/983,748 filed Dec. 1, 1992, now abandoned.

BACKGROUND OF THE INVENTION

1. Field of the Invention

The present invention relates to a digital video tape recorder (VTR) and a record carrier therefore, and more particularly, to a digital VTR and record carrier capable of forming/providing a video image during a picture search (so-called high-speed search or trickplay) mode where the record carrier is moved past the VTR playback heads at a speed different from the recording speed.

2. Description of the Prior Art

In a VTR, magnetic pick-up/record heads are mounted on a cylindrical drum, and a record carrier (e.g., magnetic tape) is wrapped about one-half way around the drum in a helical manner. As shown in FIG. 1, during recording or playback, the drum (not shown) rotates and the tape 10 is driven in the direction indicated by arrow 12 past the drum at a constant speed, thereby recording or picking-up video information signals in parallel slant (helical) tracks 14. An example of the movement of the heads relative to tracks 14 is shown by arrow 16.

During high-speed playback (or so-called trickplay) the tape is driven past the drum at a speed higher than the recording speed. This results in the magnetic heads sweeping across multiple slant tracks for each scan across the tape, as shown by the dotted arrow in FIG. 1, picking-up only a portion of the video information signal from each recorded track.

A digital VTR providing a high-speed playback mode presents some troublesome requirements. This is so because conventional digital image compression coding techniques typically use a variable number of bits to code an image, depending upon the image complexity. Therefore, when the VTR is operated in the high-speed playback mode, continuous recovery of the coded data is not possible and only portions of the recorded image are recovered. Without complete recovery of all of the coded data, image reconstruction will be severely degraded.

In order to allow proper operation of the high-speed search mode in a digital VTR, there are two basic requirements. First, there must be a fixed relationship between the position on the tape of the recovered high-speed data and the position of the reconstructed image that this data represents. Second, the bit rate of the recorded data must be fixed for some sequence of the recorded images, so that linear advances on the tape correspond to equivalent advances of the image sequence. These requirements conspire to make the application of variable length coding schemes difficult to use for digital VTR's. Since many of the current low bit rate image compression coding algorithms use a variable bit length coding schemes (incorporating, e.g., interframe motion compensation), they are not well-suited for application to digital VTRs.

U.S. Pat. No. 5,136,394 issued Aug. 4, 1992 to Haikawa et al. discloses a digital VTR having an image coding scheme which accommodates a picture search mode of operation. As disclosed therein, each image is divided into three types of pixels, namely, a, b and c, respectively, where there are twice as many c type pixels per image line as there are a and b type pixels per image line. The a, b and c type of pixels for each image are grouped together and then sequentially recorded on the tape. Furthermore, each of the groups are sub-divided into two further sub-groups, corresponding to the upper m bits and the lower n bits of the digital data representative of each pixel. During a picture search mode, only the upper bits of e.g., the "a" type pixels are recovered from the tape for providing a usable "rough" image. However, very limited picture search freedom is provided by this technique, since scanning and recovery of the pre-recorded "a" type pixels on the tape must occur.

U.S. Pat. No. 5,136,391 issued Aug. 4, 1992 to M. Minami describes a digital VTR wherein the input image is successively subsampled to divide it into a main image having low resolution components and two hierarchical subimages having the higher resolution image components. The main image is fixed bit-length coded and recorded along a central portion of each magnetic tape track and the subimages are variable bit-length coded (using, for example, adaptive DCT techniques) and recorded on the magnetic tape tracks symmetrically about opposite sides where the main image is recorded. This technique places undesirable requirements on the trickplay operation and apparatus, since it is required that the central portion of each previously recorded track be recovered in order to reconstruct a usable image.

Another technique for solving this problem is described in U.S. Pat. No. 4,807,053 issued Jan. 21, 1989 to Mr. Heignemas. As described herein, an image compression algorithm is used which results in a poor reconstruction of the image when less than all of the recorded picture data is recovered, and, when all of the data is recovered results in the best reconstruction of the image. First, the input image is divided into sub-image blocks which are encoded using a first transform coding technique. Then, successive subimages are analyzed for motion and given a motion code depending on the degree of difference between the motion of the subimages. If the next sub-image represents little motion from the prior sub-image, as indicated by its motion code, a second transform coding technique could be used, which, when combined with the prior sub-image, enables more accurate reconstruction of the input sub-images. If, however, the motion code indicates that there is greater than a certain minimum amount of motion between the successive sub-images, then the first encoding technique is used again. Thus, when all the sub-images are recovered in order, during normal play, the use of the motion codes allows sub-images with similar motion codes to be combined (even those from prior frames or fields, thus equivalent to an interframe coding type of processing) which is an advantageous image compression technique. However, if less than all the sub-image data is recovered, only those sub-images having similar motion codes and specific transform codes can be combined. If the successively recovered sub-images do not have motion codes and transform codes which allow their combination for generating a higher accuracy sub-image, they are not combined and instead the prior recovered sub-image is repeated for reconstructing the original image. This technique is not particularly advantageous since it results in a "blockiness" in the recovered signal and furthermore, the data compression is not as effective as other of the more conventional types of image compression algorithms.

Another technique developed for video image compression which takes into account the "sample skipping" inherent when recovering data from a record carrier at a speed other than its recording speed, is described by Wu et al. in an article entitled "Rate-Constrained Optimal Block-Adaptive Coding for Digital Tape Recording of HDTV [published in the IEEE Transactions on Circuits and Systems for Video Technology, Vol. 1, No. 1, March 1991. In this technique, each frame (or field) of video is partitioned into a small number of sub-images. Each sub-image is partitioned into non-overlapping blocks and each block is coded by one of a finite set of predesigned block quantizers covering a range of bit rates, which results in each sub-image being independently coded with a fixed number of bits. A near-optimal quantizer allocation algorithm based on the Lagrange Multiplier method is used to select a particular quantizer for each block. The objective is to minimize the distortion of the entire sub-image under the constraint of a fixed number of total bits for each sub-image. This rate-constrained block-adaptive technique utilizes a multi-stage compression algorithm comprising discrete cosine transformation followed by vector quantization. Although this technique allows for data reconstruction during trickplay, the multi-stage compression coding technique is expected to result in an undesirable "blockiness" of the reconstructed image during trickplay. Furthermore, the block-adaptive technique results in less than optimum data compression.

SUMMARY OF THE INVENTION

An object of the present invention is to enable recovery and reproduction of a recorded image in a digital VTR when operating in a trickplay mode.

Briefly stated, in a digital VTR in accordance with the invention, the digital video information is only separated into two data streams, the trickplay data stream (TDS) and the normal play data stream (NPDS). Both data streams are representative of the same images, but the TDS uses less bits per given image than the NPDS, and therefore the TDS represents a lower resolution image as compared to the NPDS. Consecutive portions of both data streams are grouped together to form successive sync blocks, which are then successively recorded on the record carrier in parallel slant tracks. During trickplay recovery, only the recovered TDS portion of the sync words are used to reconstruct the image, and during normal playback, the NPDS portion is used alone, or in conjunction with the TDS portion, to reconstruct the image. The TDS portion is fixed bit-length coded, so that the TDS portion of each and every one of the sync blocks (or words) recovered as the magnetic tape scans obliquely across the multiple tracks, can be used to reconstruct an image. Fixed bit-length coding is advantageously appropriate for the low resolution TDS portion. The NPDS, having the requirement to represent the normal play image, has a much higher data rate, and therefore advantageously uses a coding scheme employing variable bit-length coding algorithms.

In accordance with a further aspect of the invention, the TDS portion is formed by subband decomposition of the original image to form smaller images, which are then coded using vector quantization techniques.

In accordance with a still further aspect of the invention, in a preferred embodiment of the invention, the TDS and NPDS are related in a hierarchical fashion, so that both the TDS and NPDS portions of each sync word are used to reproduce a recovered image during normal play. This improves even further the efficiency of the image compression.

Thus, a main advantage of the present invention is that conventional parallel slant track recording techniques are used, while allowing for image reconstruction during high-speed search. This advantage results from including in the successively recorded sync blocks, consecutive portions of the fixed bit-length coded TDS. Since it's fixed bit-length coded, it is decodable without reference to other ones of the sync blocks, which may not be recovered from the tape, and since the TDS portions are consecutive, as the multiple tracks are scanned during the high-speed search mode, unrecovered TDS portions of missed sync blocks can be replaced with TDS data which is representative of similarly positioned image portions from other sync blocks which are recovered.

These and other objects and advantages of the present invention will become more apparent from the following detailed description of the present invention when read in conjunction with the accompanying drawings.

DETAILED DESCRIPTION OF THE INVENTION

Figure 1:
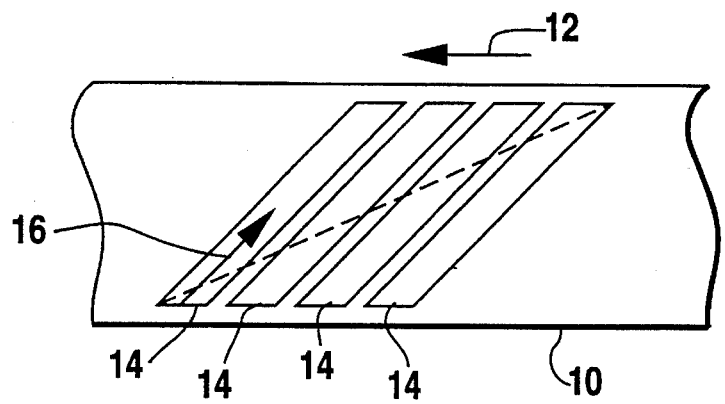
FIG. 1, previously described, illustrates the prior art helical scan parallel tracking format and a problem which occurs during trickplay.
Figure 2:
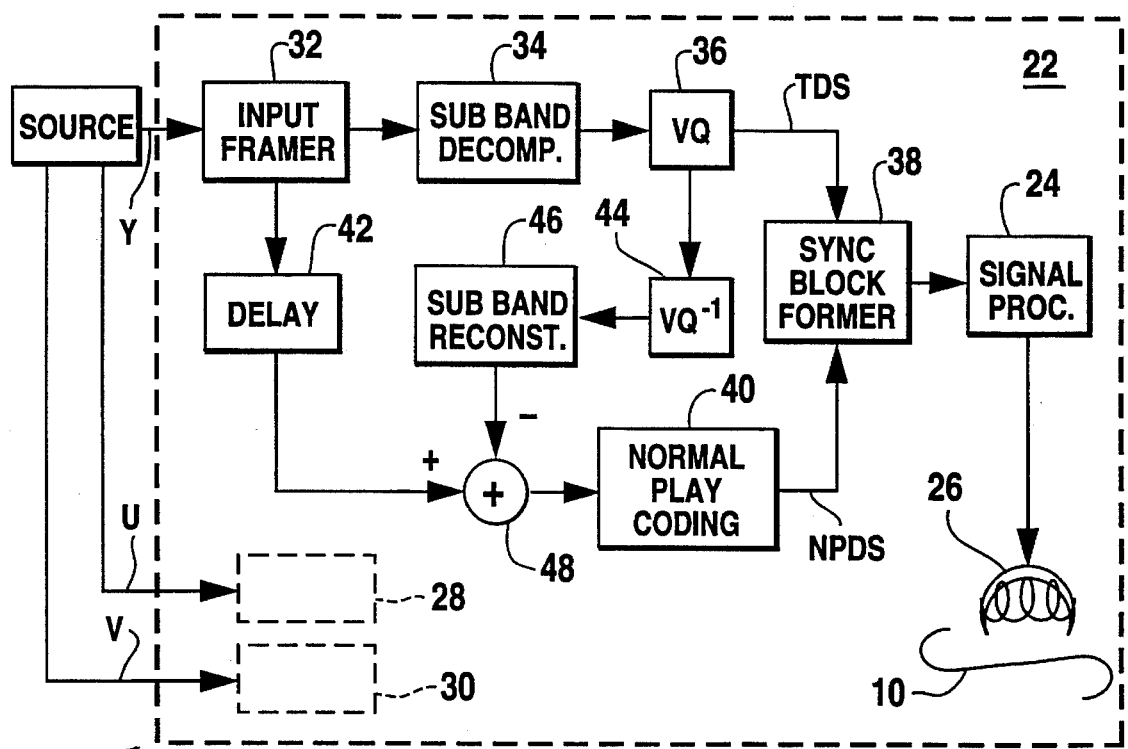
FIG. 2 is a block diagram of the inventive compression coding algorithm, as used in a digital VTR.

Referring to FIG. 2, the recording portion of a digital VTR 20 constructed in accordance with one aspect of the invention is shown. VTR 20 includes video signal compression encoding portion 22 constructed in accordance with the principles of the invention and a conventional signal processing portion 24 and recording head 26 for digitally recording the video signal on a magnetic tape 10. For simplicity, only one encoding portion 22 is shown, which receives a luminance (Y) signal from a digital signal source coded, for example, in accordance with CCIR Recommendation 601. Additional encoding circuits 28 and 30 would also be required for processing the chrominance components, i.e., U and V.

An input framer 32 receives the successive frames of source digital video and provides it to a subband decomposition module 34 where it is decimated so as to make smaller image frames. For example, for the luminance component of each input frame, the frame size could be 720 pixels horizontally by 480 lines (pixels) vertically. The subband decomposition and decimation results in luminance fields having 180 pixels horizontally by 120 lines vertically. This is accomplished, as described in greater detail with respect to FIG. 5, by low pass filtering and decimation, twice in the horizontal direction and twice in the vertical direction. These smaller images are then coded for data compression using conventional quantization techniques by a Vector Quantization (VQ) module 36, to form the Trickplay Data Stream (TDS). For accomplishing vector quantization, these smaller images must be organized into fixed size vectors. In the present embodiment, either one of two different vector sizes are preferred, sixteen small pixels horizontally and one pixel vertically (16×1) or eight small pixels horizontally and two pixels vertically (8×2). These vectors are then quantized in accordance with conventional techniques, using a fixed-size code book for generating TDS code words. These VQ code words are then used to form the TDS.

The TDS is applied as a first input to a sync block former 38, which combines the TDS code words with code words representative of the normal play video signal, as will be described next, in successive ones of the sync blocks.

Simultaneously with the formation of the TDS, a normal play data coder 40 processes the input image frames in accordance with any one of several known high quality image compression coding techniques, preferably employing variable bit-length coding, such as that proposed by the MPEG Standards Committee and described, for example, in their Document ISO-IEC/JTC1/SC29/WG11, Document #AVC260 dated May 1992 entitled "Test Model 1" and MPEG 92/160, for developing successive code words representative of the normal play image, called a Normal Play Data Stream (NPDS). Of course, appropriate modifications may be necessary to the conventional MPEG techniques to constrain the coding to be fixed over some desired number of frames of the input sequence, e.g., four as a trade off between desired edit boundaries and compression ratio. The NPDS is then supplied as a second input to the sync block former 38.

A delay module 42 provides a delay to the input frames supplied to coder 40, so that when sync block former 38 groups portions of the TDS and NPDS into a single sync block or word, the portion of the input frame which each grouped data stream represents is substantially similar. However, since the TDS is fixed-length coded, consecutive TDS portions in successive ones of the sync blocks results in a predetermined and known correlation between the position on the tape of the sync block and the position in the recorded image which is represented by the TDS in that sync block. Stated another way, the TDS and NPDS are only representative of substantially similar portions of the input image because, although consecutive portions of the TDS are representative of adjacent portions of the input frame and are placed in consecutive ones of the successive sync blocks, the consecutive portions of the NPDS no longer bear the same spatial relation to the input frame as the TDS, due to their variable bit-length coding scheme.

The sequential sync blocks are then processed using conventional VTR signal processing circuits 24 and applied to a magnetic head 26 for recording the sync blocks, or sync words, sequentially on a magnetic tape 10 in a plurality of parallel slant tracks.

In the preferred embodiment, a hierarchical scheme is used for coding the NPDS, by reconstructing the TDS and then subtracting it from the input image before forming the NPDS. Deletion of the TDS from the NPDS results in a more efficient coding scheme, since the TDS information is already being separately provided. As shown in FIG. 2, the TDS is processed by an inverse vector quantizer 44 which recreates the decimated versions of the input images and a subband reconstruction module 46, which essentially comprises an interpolation circuit for operating on the pixels of the decimated images, reconstructing the original image frame. A subtraction circuit 48 subtracts the reconstructed TDS from the input frame for providing a reduced bit density input image to the normal play coding module 40.

Figure 3:
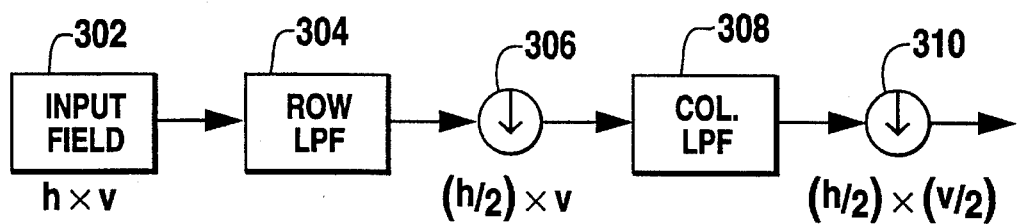
FIG. 3 illustrates subband decomposition and decimation, as used in the apparatus of FIG. 2.

FIG. 3 illustrates in block diagram form a representation of subband decomposition as used herein. An input image field 302 has an initial size of h x v (such as 720 pixels by 480 lines for the Y component). Separable filters 304 and 308 are used to low pass filter the rows and columns, respectively, of the input image before decimation by two rows via module 306 and two columns via module 310. As well known, the filters are needed to prevent aliasing after decimation. Also, the filters need not be separable, as they are shown in FIG. 3. Each pass of an image field through the processing of FIG. 3 results in one-half of the field width (h) and height (v). In the preferred embodiment, the Y and U, V components are decimated twice horizontally and once vertically to produce luminance fields of 180 by 120 pixels and chrominance fields of 90 by 120 pixels.

Figure 4:
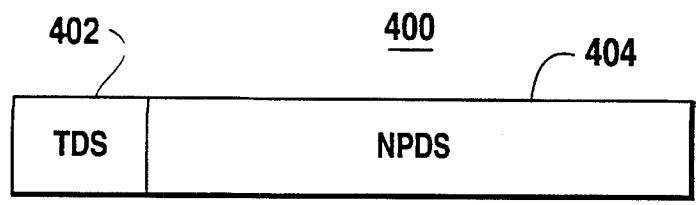
FIG. 4 illustrates a sync block, as generated by the apparatus of FIG. 2.

FIG. 4 illustrates the placement of the TDS and NPDS code words on the tape. A sync block or word 400 includes a first part 402 which accounts for approximately 10% of the length of block 400 and includes a portion of the fixed bit-length coded TDS recorded therein. As described later on, each portion can comprise 23 code words (for a 8×2 vector quantization), or 6 code words (for a 16×1 vector quantization). A second part 404 of word 400 includes a portion of the variable length coded NPDS recorded therein. For the sake of simplicity, not shown are additional parts of video sync words which are conventional, such as, data relating to identification of the sync words, error correction, e.g., parity, and other lower level "administrative" type of data normally included in digitized data systems.

As previously noted, the placement of data on the tape is important to the functioning of the present invention during trickplay. In the preferred embodiment, the data is recorded using one track for each field of the input image. Each track is divided into 240 sync words having a fixed length, with an average of one sync word for each line in the original image field.

Assuming e.g., that in the NPDS the bit rate is fixed over 4 frames, then the NPDS for these 4 frames spans all of the sync words over 8 parallel tracks (i.e., 4 frames). Thus, in order to decode the NPDS, the decoder must start at the beginning of an 8 track sequence to get all of the data from the successive sync words on these 8 tracks. However, the TDS is placed in the sync words so that ideally, only one sync words needs to be recovered to produce a line of the original image. During trickplay the decoder can thus, theoretically, use any of the recovered sync words, no matter where the recovery of data on the tape begins. In the present embodiment, however, due to current technology limitations with respect to tape bandwidth and bit density, 4 sync words are used to represent 4 lines of TDS code words. This still results, however, in an average of 1 sync word per image line and has been found to be acceptable. The manner of obtaining TDS code words representative of 4 lines results from the use of 8×2 pixel blocks when performing VQ of the decimated image, and will be discussed later on in greater detail during the description of the decoding circuitry.

Figure 5:
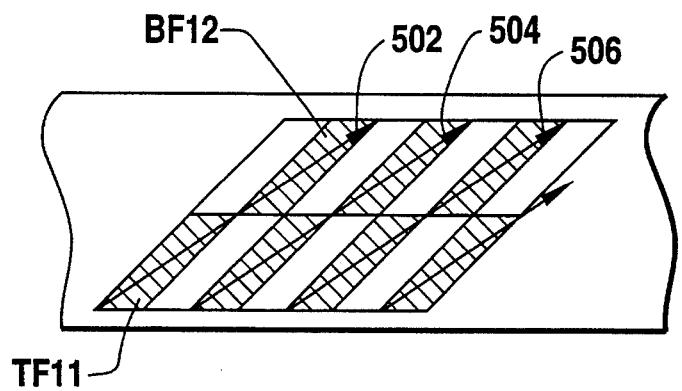
FIG. 5 illustrates placement and recovery of the sync blocks on a magnetic tape.

FIG. 5 illustrates how the recorded sync words are recovered during formation of a trickplay image. In general, the images formed during trickplay are similar to those formed by conventional analog VTR's during trickplay. That is, the trickplay image will consist of "strips" of consecutive lines of the input image sequence which are recovered as the magnetic heads skew across the tape. A tape 500 includes 240 sync words representative of each field, recorded on each of the parallel slant tracks. Thus, 2 adjacent tracks represent, e.g., field 1 and 2 of a given frame. When the VTR is operated at e.g., 2×normal play speed, the sync word data will be recovered in "strips" as indicated by the shading in FIG. 5. That is, as shown by the arrows in FIG. 5, each trickplay image will have a top half derived from the top 120 lines of the first field of a first frame ($TF_{11}$) and a bottom half derived from the last 120 lines of the second field ($BF_{12}$) of the first frame, and so on. This example is scalable to also be illustrative of data recovery at further multiples of the picture search speed.

During normal play, all the data is recovered (both TDS and NPDS) and normal play pictures are produced from the successively recovered sync blocks. During trickplay, however, for example at two times normal speed, one frame of video is produced for every two frames of the original input sequence. This is indicated by the pick-up of consecutive "strips" of the successive frames shown in FIG. 5 when the head scans a skewed track such as shown by arrows 502, 504 and 506.

As mentioned above, for trickplay it is critical that portions of the image be decodable without reference to any other portion of the image sequence. This constraint makes the use of motion compensation very difficult. The present invention avoids these difficulties by ignoring the NPDS during trickplay. During trickplay it is only necessary to get a minimum number (currently four, but ideally one) of sync words to decode the same minimum number of lines of the original picture. The data in the TDS portion of these sync words can be reconstructed, in accordance with the preferred embodiment, to reconstruct either two or four lines of the original field of video.

Referring again to FIG. 3, this processing creates a low resolution version of the input image (field or frame) by subband decomposition and decimation (SDD). The SDD image is then coded for recording or transmitting using vector quantization (VQ). The vector size for the VQ can be, for example, 8 by 2 or 16 by 1. An 8 by 2 vector size means each vector is representative of eight pixels horizontally and two pixels vertically of the SDD image. Note that each pixel in the vertical direction of the SDD image is representative of pixels over two horizontal lines of the input image and therefore each coded vector, being representative of pixels of two horizontal lines of the SDD, is representative of image information over four horizontal lines of the input image. If a vector size of 16 by 1 were used, it can be seen when applying the same analysis as described above for the 8 by 2 vector size, each VQ code word (a coded vector) will be representative of information over two lines.

Since a line width is 720 pixels (for luminance), a four times interpolation scheme would allow the recovery of 180 pixels to reconstruct the 720 pixel video image. Actually, an excess 12 pixels are needed (for a total of 192 pixels) due to pixel "runoff", etc. Then, recovery of 24 VQ code words will be sufficient to reconstruct the full width of the input image. This is so because each of the 24 VQ code words, as noted above, is representative of 8 horizontal pixels (when using the 8 by 2 vector size) and 24 by 8 equals 192 pixels. Furthermore, since in accordance with the principles of the invention, an average of 1 image line is recorded per sync word, and since pixels from 4 image lines are represented by each VQ code word, it is necessary that each sync word include 6 VQ code words. Then, recovery of 4 sync words yields 24 code words which are representative of 4 full width lines of the input image. Thus, the desired average of 1 full horizontal line per sync word is established.

In accordance with the embodiment wherein the vector size is 16 by 1, only 13 (actual 12.5) VQ code words need to be recovered to obtain the 192 pixels needed to reconstruct the full width of the input image. Thus, using an average of 6 code words per sync word, only 2 sync words need to be recovered to reconstruct the full width image. Since each code word is representative of pixels from 2 adjacent lines of the input image, an average of 1 line per sync word is still maintained. As previously noted, it is this average of 1 complete image line per sync word which the inventors feel results in a more pleasing reconstruction of the input image during trickplay.

Figure 6:
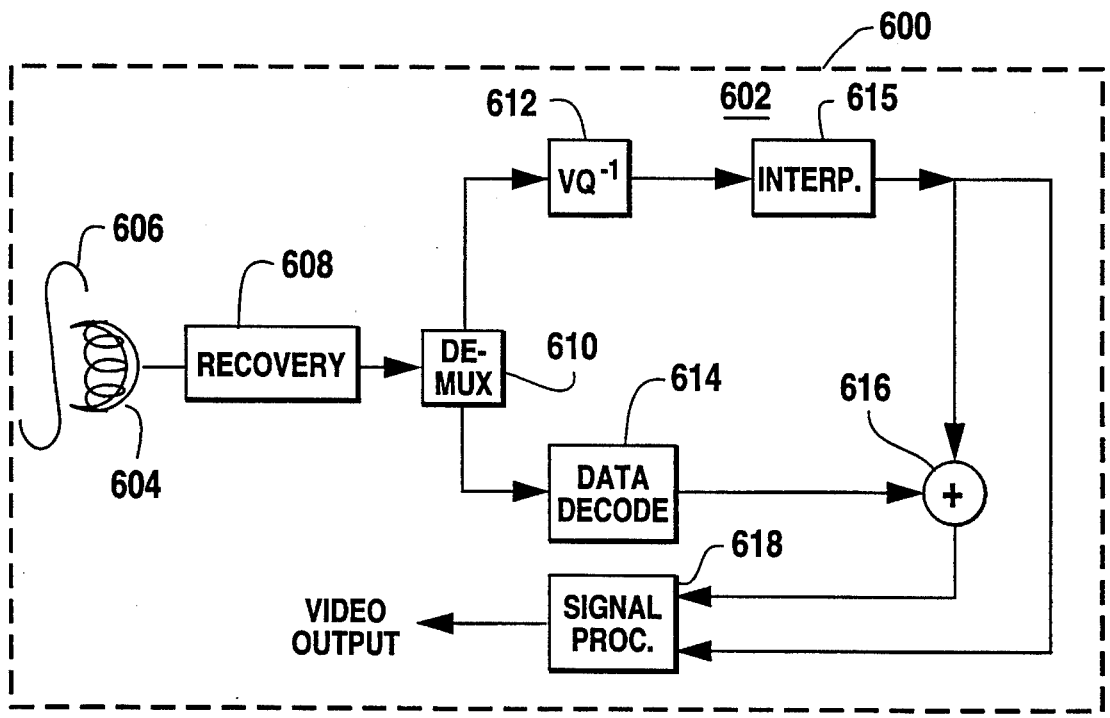
FIG. 6 is a block diagram of a digital VTR having a decoder for recovering data recorded using the apparatus of FIG. 2.

As shown in FIG. 6, a VTR 600 includes a decoder 602 as shown in FIG. 6. A conventional magnetic pick-up head 604 recovers the sync words from the tape 606 in conjunction with a recovery circuit 608 of conventional design. A demultiplexer 610 separates the TDS and NPDS data and provides the TDS data to an inverse VQ module 612 and the NPDS to a conventional MPEG data decoder 614 which is complimentary to the MPEG coding used in the encoding process of FIG. 2. Inverse VQ module 612 and an interpolator module 615 reconstruct the "small" images, in a manner similar to that already described with respect to module 44 and 46 of FIG. 2. Since the NPDS is hierarchically coded, the recovered TDS is combined by combiner 616 with the recovered NPDS to reconstruct the original NPDS. Signal processing circuits 618 (including D/A conversion) are then used to process the NPDS during normal play, or the TDS during high-speed search, for developing a conventional analog video output.

Thus, there has been shown and described a novel method and apparatus for digitally coding an image. Many changes, however, can become apparent after considering this specification. For example, although hierarchical coding is used, namely subtracting the TDS from the NPDS, this is not necessary to practice the present invention. Furthermore, during trickplay or normal play, unused portions of the encoder of FIG. 2 or the decoder of FIG. 6 can be deactivated. These and other changes and modifications are considered to be within the scope and spirit of the present invention which is limited only the claims which follow.

We claim:

1. A method of compression encoding successive input images into pluralities of sync words sequentially and regularly arranged in time, each of said pluralities of sync words consisting of the same number of sync words as each of the other said pluralities and being suited for recording in a respective one of parallel tracks of a prescribed length arranged along the surface of a recording tape for helical scanning, each of said sync words having a first prescribed bit-length, each of said sync words containing a reserved portion therein at a standardized bit location and of a second prescribed bit-length substantially shorter than said first prescribed bit-length, said first and second prescribed bit-lengths each remaining fixed over the time said successive input images are encoded, said method comprising the steps of:

digitally processing a signal descriptive of each of said input images in accordance with a first image compression encoding technique, so as to generate a first digital signal representative of first versions of said input images, said first versions having reduced resolution as compared to said input images;

digitally processing said signal descriptive of each of said input images in accordance with a second image compression encoding technique which is different from said first image compression encoding technique, so as to generate a second digital signal representative of second versions of said input images, said second versions having resolution higher than said reduced resolution;

selecting consecutive portions of said first digital signal as so generated, said consecutive portions of said first digital signals each being no longer than said second prescribed bit-length, said consecutive portions of said first digital signals each describing a fraction no larger than one quarter of the full area of one of said input images;

selecting consecutive portions of said second digital signal as so generated, said consecutive portions of said second digital signals each being no longer than said first prescribed bit-length minus said second prescribed bit-length, said consecutive portions of said second digital signals each on average describing said fraction no larger than one quarter of the full area of one of said input images;

combining consecutive portions of both said first and second digital signals as so selected, to form each of said sync words, the consecutive portions of said first digital signal being placed in the reserved portions of said sync words and the consecutive portions of said second digital signal being placed in portions of said sync words other than the reserved portions; and grouping said sync words into said pluralities of sync words for being sequentially recorded in respective ones of said parallel tracks of said prescribed length, a respective plurality of said sequential sync words being supplied for sequentially recording the length of each of said parallel tracks, so as to be disposed in respective ones of each of a plurality of subintervals of that length.

2. The method of claim 1, wherein:

the reserved portion of each said sync word is filled with bits of said first digital signal;

said first digital signal is decodable without reference to image coded signal from any other of said sync words;

said second digital signal uses variable-bit-length coding to describe said high-resolution versions of said input images;

each said sync word comprises as many variable-bit-length code words of said second digital signal as can be accommodated in its said portion other than its said reserved portion; and the variable-bit-length code words of said second digital signal in some sync words require reference to the variable-bit-length code words of said second digital signal from at least one other sync word in order to be decoded.

3. The method of claim 1, wherein said first image compression encoding technique comprises the substeps of:

digital low pass filtering and decimation of each of said input images so as to generate a respective low-resolution decimated image; and coding blocks of pixels in each said low-resolution decimated image using vector quantization techniques.

4. The method of claim 2, wherein said step of digitally processing each of said input images in accordance with a second image compression encoding technique comprises as an initial substep thereof said step of digitally processing each of said input images in accordance with a first image compression encoding technique, so as to provide a first digital signal representative of a low-resolution version of each of said input images, and further comprises as subsequent substeps thereof:

reconstructing a low-resolution version of each of said input images from said first digital signal, each which reconstructed version has picture elements corresponding in spatial position to picture elements of a corresponding one of said input images;

subtracting from each picture element of the corresponding input image a corresponding picture element of the reconstructed version, thereby to generate a respective picture element of a corresponding modified input image; and completing the generation of said second digital signal representative of a higher-resolution version of each of said input images in accordance with a second image compression encoding technique which is different from said first image compression encoding technique, using said corresponding modified input image.

5. A method as set forth in claim 1 wherein each of said sequential sync words includes a respective portion of said first digital signal descriptive of a respective strip of one of said successive input images extending over substantially the entire distance between left and right edges thereof, but only a fraction of the distance between top and bottom edges thereof.

6. In a video cassette recorder for recording a magnetic tape and including video signal processing circuits for processing sequential images as represented by a video signal and generating digital signals comprising a plurality of sequential sync words for recording on a magnetic tape along respective lengths of a plurality of parallel slant tracks, said video cassette recorder including a normal play mode wherein substantially all of said sync words are sequentially recovered from each of said plurality of slant tracks for generating a signal representative of a normal resolution image at a normal presentation speed, and a trickplay mode wherein substantially less than all of the sync words on a given track are recovered from each of said plurality of slant tracks for generating a signal representative of a reduced resolution image which is presented at a speed faster than said normal speed, a method for recording said video signal on said tape, comprising the steps of:

digitizing said video signal representative of said sequential images, so as to generate a digitized video signal representative of said sequential images as originally digitized;

digitally processing the portions of said digitized video signal representative of each of said sequential images in accordance with a first image compression encoding technique, so as to provide a first digital signal representative of first versions of said sequential images, said first versions having reduced resolution as compared to said sequential images as originally digitized;

digitally processing the portions of said digitized video signal representative of each of said sequential images in accordance with a second image compression encoding technique which is different from said first image compression encoding technique, so as to provide a second digital signal representative of second versions of said sequential images, said second versions having resolution higher than said reduced resolution;

combining respective consecutive portions of both said first digital signal and said second digital signal within each of said sequential sync words, said consecutive portions of said first digital signal each describing a fraction no larger than one quarter of the full area of one of said sequential images, said consecutive portions of said second digital signal each on average describing said fraction no larger than one quarter of the full area of one of said sequential images; and supplying said sequential sync words for being sequentially recorded on a record carrier, such that a respective plurality of said sequential sync words is recorded along the length of each of said plurality of parallel slant tracks, so as to be disposed in respective ones of each of subintervals of that length.

7. The method of claim 6, wherein:

each said sync word includes in a reserved portion thereof a fixed number of bits of said first digital signal;

said first digital signal is decodable without reference to image coded signal from any other of said sync words;

said second digital signal uses variable-bit-length coding to describe said second versions of said sequential images;

each said sync word comprises as many variable-bit-length code words of said second digital signal as can be accommodated in its said portion other than its said reserved portion; and the variable-bit-length code words of said second digital signal in some sync words require reference to the variable-bit-length code words of said second digital signal from at least one other sync word in order to be decoded.

8. The method of claim 6, wherein said first image compression encoding technique comprises:

digital low pass filtering and decimating each of said sequential images so as to generate a respective low resolution decimated image; and coding blocks of pixels in said decimated image using vector quantization techniques.

9. The method of claim 8 wherein said vector quantization techniques for coding blocks in said decimated image are of a type for generating fixed-length codes descriptive of respective portions of said decimated image.

10. The method of claim 6, wherein said step of digitally processing each of said sequential images in accordance with a second image compression encoding technique comprises as an initial substep thereof said step of digitally processing each of said sequential images in accordance with a first image compression encoding technique, so as to provide a first digital signal representative of a low-resolution version of each of said sequential images, and further comprises as subsequent substeps thereof:

reconstructing a low-resolution version of said sequential images from said first digital signal, which reconstructed version has picture elements corresponding in spatial position to picture elements of respective said sequential images;

subtracting from each picture element of each of the sequential images a corresponding picture element of the reconstructed image, thereby to generate a respective picture element of a modified sequential image; and completing the generation of said second digital signal representative of a higher-resolution version of each of said sequential images in accordance with a second image compression encoding technique which is different from said first image compression encoding technique, using said modified sequential image.

11. In a video cassette recorder for recording a magnetic tape and including video signal processing circuits for processing sequential images representative of portions of a video signal and generating digital signals comprising for recording on a magnetic tape along respective lengths of a plurality of parallel slant tracks, apparatus for recording said video signal on said tape, comprising:

digitizing means for digitizing said video signal so as to generate a succession of digital samples descriptive of the picture elements of a succession of input images;

first encoding means for digitally processing each of said input images in accordance with a first image compression encoding technique so as to generate a first digital signal representative of first versions of said input images, said first versions having reduced resolution as compared to said input images;

second encoding means for digitally processing each of said input images in accordance with a second image compression encoding technique which is different from said first image compression encoding technique so as to generate a second digital signal representative of second versions of said input images, said second versions having resolution higher than said reduced resolution;

combining respective consecutive portions of both said first digital signal and said second digital signal within each of sequential sync words, said consecutive portions of said first digital signal each describing a fraction no larger than one quarter of the full area of one of said sequential images, said consecutive portions of said second digital signal each on average describing said fraction no larger than one quarter of the full area of one of said sequential images; and applying means for applying said sequential words to said magnetic tape for being sequentially recorded on a record carrier, such that a respective plurality of said sequential sync words is recorded along the length of each of said plurality of parallel slant tracks, so as to be disposed in respective ones of each of a plurality of subintervals of that length.

12. The apparatus of claim 11, wherein:

said second encoding means is of a type that generates variable-bit-length code words;

said combining means forms each sync word using a fixed number of bits of said first digital signal, said fixed number of bits of said first digital signal being decodable without reference to image coded signal from any other sync word; and said combining means forms each sync word using as many variable-bit-length code words of said second digital signal as can be accommodated in that sync word, the variable-bit-length code words of said second digital signal in some sync words requiring reference to the variable-bit-length code words of said second digital signal from at least one other sync word in order to be decoded.

13. The apparatus of claim 11, wherein said first encoding means comprises:

digital low pass filtering and decimation of each of said input images so as to generate a respective low-resolution decimated image; and vector quantization means for coding blocks of pixels in each said low-resolution decimated image using vector quantization techniques, thereby generating a respective portion of said first digital signal.

14. The apparatus of claim 13, further wherein said second encoding means includes said first encoding means and further includes:

reconstruction means for generating reconstructed images, in response to said first digital signal, each said reconstructed image having picture elements corresponding in spatial position to the picture elements of a corresponding one of said input images;

means for subtracting from each of the picture elements of each said input image a corresponding picture element of the corresponding said reconstructed image, thereby to generate respective picture elements of a corresponding modified input image; and means for completing the generation of said second digital signal representative of a higher-resolution version of each of said input images in accordance with a second image compression encoding technique which is different from said first image compression encoding technique, using said modified input images.

15. The apparatus of claim 13 wherein said vector quantization means for coding blocks in said decimated image use vector quantization techniques of a type for generating fixed-length codes descriptive of respective portions of said decimated image.

16. In a video cassette player for recording a magnetic tape and including video signal processing circuits for processing sequential sync words of digital signals representative of portions of a video signal which are recovered from a plurality of parallel slant tracks recorded on said tape, each of said slant tracks having a prescribed number at least two of said sync words recorded along a respective length thereof so as to be disposed in respective ones of each of a plurality of subintervals of that length, said video cassette player including a normal play mode wherein substantially all of said sync words are sequentially recovered from each of said plurality of slant tracks for generating a video signal representative of a normal resolution image at a normal presentation speed, and a trickplay mode wherein substantially less than all of the sync words on a given track are recovered from each of said plurality of slant tracks for generating a video signal representative of a reduced resolution image which is presented at a speed faster than said normal presentation speed, apparatus for recovering said video signal from said tape, said apparatus comprising:

recovery means for recovering at least one of said sync words from each track of said tape during said trickplay mode and for recovering more of said sync words from each track of said tape during said normal play mode;

signal separating means, responsive to the sync words recovered by said recovery means, for separating from each sync word first and second digital signals, wherein the first digital signals from each sync word are representative of a fraction no larger than one quarter of the full area of one said reduced resolution image, and the second digital signals from two or more sync words are representative of said normal resolution image;

first decoding means for digitally processing the first digital signals of each of said sync words in accordance with a first decoding technique using a fixed number of bits from each recovered sync word so as to provide a first video signal representative of said fraction of one said reduced resolution image;

second decoding means for digitally processing the second digital signals from two or more of each of said sync words in accordance with a second decoding technique which is different from said first decoding technique so as to provide a second video signal representative of said normal resolution image; and video signal selector means for providing said first video signal during said trickplay mode of player operation, and providing said second video signal during said normal play mode of player operation.

17. The apparatus of claim 16, wherein said first decoding means comprises:

means for performing inverse vector quantization and interpolation of said first digital signals so as to generate said reduced resolution image.

18. The apparatus of claim 17 in a video cassette player, wherein said speed faster than said normal presentation speed is not constrained to being a small multiple of said normal presentation speed, and wherein on average the segments of first digital signal in a few of said sync words represent about the same number of horizontal lines in said video signal.

19. The apparatus of claim 16, wherein said second decoding means comprises:

an MPEG decoder.

20. A method of compression encoding each of a plurality of input images into a multiplicity of successive sync words of uniform bit length, comprising the steps of:

digitally processing each of said input images in accordance with a fixed-length image compression encoding technique, so as to generate a first digital signal representative of successively considered strips of low-resolution versions of said successive input images, each of which strips extends over substantially the entire distance between left and right edges of said input image being digitally processed in accordance with said fixed-length image compression encoding technique for producing that said strip, but extends over only a fraction of the entire distance between top and bottom edges of said input image being digitally processed in accordance with said fixed-length image compression encoding technique for producing that said strip, said fraction being smaller than one-half;

reconstructing from said first digital signal a low-resolution version of each of said successive input images, each of which reconstructed images has picture elements corresponding in spatial position to picture elements of a corresponding one of said input images;

subtracting from each picture element of each of said successive input images a corresponding picture element of a corresponding one of said reconstructed images, thereby to generate a respective picture element of a corresponding modified input image;

digitally processing each of said modified input images with a resolution higher than said reduced resolution in accordance with a variable-length compression encoding technique, thereby to generate a second digital signal;

including in a first prescribed portion of each successive one of said sync words a segment of said first digital signal descriptive of a respective one of said successively considered strips of low-resolution versions of said successive input images; and including in a second prescribed portion of each successive one of said sync words a segment of said second digital signal.

21. The claim 20 method of compression encoding wherein said step of digitally processing each of said input images in accordance with a fixed-length image compression encoding technique includes the substeps of:

subband decomposition and decimation of each of said input images to convert relatively dense samples descriptive of its picture elements individually considered to relatively sparse samples; and vector quantization of the relatively sparse samples, using codes of a prescribed fixed size, for generating said first digital signal.

22. The claim 20 method of compression encoding, included as steps of a method for helically recording a magnetic tape with a plurality of parallel tracks of similar length crossing a width of the magnetic tape at a prescribed angle of skew, which method for helically recording magnetic tape further includes the step of:

recording a respective plurality of said sequential sync words along the length of each of said parallel tracks.

23. In a video cassette recorder for recording a magnetic tape and including video signal processing circuits for processing sequential images representative of portions of a video signal and generating digital signals comprising pluralities of sequential sync words for recording on the magnetic tape along respective lengths of a plurality of parallel slant tracks, an apparatus for recording said video signal on the magnetic tape, comprising:

digitizing means for digitizing said video signal, so as to generate a succession of digital samples descriptive of the picture elements of a succession of input images;

first encoding means for digitally processing each of said input images in said succession in accordance with a fixed-length image compression encoding technique, so as to generate a first digital signal representative of successively considered strips of low-resolution versions of said input images in said succession, each of which strips extends over substantially the entire distance between left and right edges of one of said input images in said succession, but extends over only a fraction of the entire distance between top and bottom edges of that said input image, said fraction being smaller than one-half;

reconstruction means for generating reconstructed images, in response to said first digital signal, each said reconstructed image having picture elements corresponding in spatial position to picture elements of a corresponding one of said input images in said succession;

means for subtracting from each of the picture elements of each said input image in said succession a corresponding picture element of the corresponding reconstructed image, thereby to generate respective picture elements of a corresponding modified input image;

second encoding means for digitally processing each of said modified input images with a resolution higher than said reduced resolution in accordance with a variable-length compression encoding technique, thereby to generate a second digital signal; and sync word formation circuitry for generating said sequential sync words, which are of uniform duration, a respective plurality of said sync words being sequentially recorded along the length of each of said parallel slant tracks, said sync word formation circuitry including in a first prescribed portion of each of said sync words a segment of said first digital signal descriptive of a respective one of said successively considered strips of low-resolution versions of said input images in said succession, and said sync word formation circuitry further including in a second prescribed portion of each of said sync words a segment of said second digital signal.

24. Apparatus for recording as set forth in claim 23, wherein on average the segments of said first digital signal in a few of said sync words represent about the same number of horizontal lines in said video signal.

25. A method of recording on an image-storing record carrier, said method comprising the steps of:

recording a respective succession of sync words of the same bit-length in respective subintervals along the length of each of a plurality of parallel slant tracks on said image-storing record carrier, every said subinterval along the length of each said slant track in said plurality of parallel slant tracks being recorded with a respective one of said sync words, a respective portion of a first signal and a respective portion of a second signal being contained in each and every one of said sync words recorded along the length of each said slant track in said plurality of parallel slant tracks;

including in successive ones of said sync words recorded along the length of each said slant track respective consecutive portions of a first signal, which consecutive portions of said first signal correspond to spatially adjacent portions of an input image; and including in said sync words respective portions of a second signal, the respective portions of said first and second signals included in each of said sync words being representative of approximately the same portion of said input image, but with different resolutions.

26. The method of claim 25, further comprising steps of:

including a fixed number of bits of said first digital signal in each of said sync words, which fixed number of bits are decodable without reference to signal from any other of said sync words; and including a variable number of bits of said second digital signal in each of said sync words that are not decodable without reference to portions of said second digital signals in other ones of said plurality of sync words.

27. The method of claim 25, wherein said step of including in successive ones of said sync words respective consecutive portions of a first signal is carried out such that there is an average of one horizontal line of the input image represented by the first digital signal of each sync block.

* * * * *